Feb. 18, 1947.  E. P. NICHOLLS  2,416,063
TUBE CLAMP
Filed June 11, 1942

INVENTOR.
EARL PALMER NICHOLLS
BY H. W. Brelsford
ATTORNEY

Patented Feb. 18, 1947

2,416,063

UNITED STATES PATENT OFFICE 2,416,063

TUBE CLAMP

Earl Palmer Nicholls, North Hollywood, Calif., assignor, by mesne assignments, to Bendix Aviation Corporation, South Bend, Ind., a corporation of Delaware Application June 11, 1942, Serial No. 446,554

2 Claims. (Cl. 174—40)

This invention relates to tube clamps, and more particularly to a cushioned tube clamp having an electrical conductor to remove electric charges from any tube that may be held by the tube clamp.

A tube clamp is used primarily to secure tubes or conduits to the frame or other parts of an airplane. The tube clamps are ordinarily cushioned to prevent injury to the tube, and since most cushions are electrical insulators, electrical bonding strips must be provided to equalize electrical potential between the airframe and the tube. Electrical bonding prevents static discharges around the cushion, which discharges interfere with radio transmission and reception.

In the past such electrical bonding strips were secured to one end of the metal strap forming the clamp, or were held loosely in engagement with the metal strap by an elastic cushion. Both of these constructions were subject to the corrosive influence of salt water spray, or salt laden air, which is encountered by planes flying near or over ocean areas. The salt spray corrodes the bonding strip until an insulating coating of corrosion is built up between the bonding strip and the tube and/or between the bonding strip and the metal strap.

The present invention seeks to overcome these difficulties. A cushion is securely cemented or vulcanized or otherwise secured to a metal strap. Holes are cut into the cushion and a piece of metal or other conductor is placed in the hole and adapted to contact, in the region of the hole, the tube held by the clamp. The conductor is then attached to the metal strap. In such a clamp the cushion completely surrounds the bonding strip and when the clamp is tightly gripping a tube, all moisture and air are excluded from contacting the bonding strip.

It is therefore an object of the invention to provide a cushioned and bonded tube clamp wherein the bonding strip is completely protected from outside conditions.

Another object of the invention is to provide a tube clamp wherein the contact of a bonding strip with a tube is not dependent upon cushion compression.

Still another object is to provide a tube clamp having a bonding strip held in contact with a tube by the resiliency of the bonding strip.

A further object is to provide a cushioned tube clamp having a bonding strip of a type adapted to break through protective coatings on tubes during normal operation.

Other objects and advantages of the invention will be apparent in the following description and claims.

In the drawing forming a part of this specification:

Figure 1:
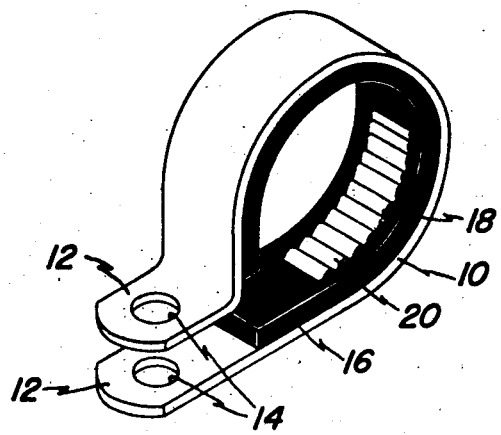
Figure 1 is an isometric view of a cushioned and bonded tube clamp made in accordance with this invention.

A metal strap 10 is bent in a general loop form having its ends 12 generally parallel and having holes 14 therein, through which a bolt may be passed to secure the clamp as a whole to a structure. Cemented to the inside of strap 10 is a cushion 16 of any waterproof or water resistant material. The cushion 16 may also be of a snap-on type, in which case operating compression pressure forms a waterproof seal between the cushion and metal strap. A longitudinal hole, or alternatively a recess, 18 is cut in cushion 16, exposing a part of strap 10. Placed in hole 18 and secured to strap 10 is a conductor element, or bonding strip, 20 having a series of transverse ridges for contacting any conduit that may be placed in the tube clamp.

Figure 2:
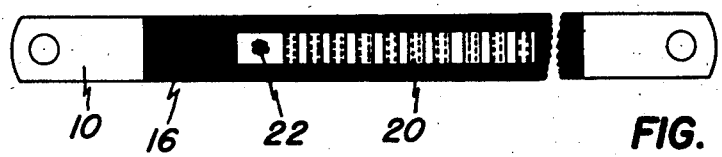
Figure 2 is a plan view of the assembly of Figure 1 before it is bent to the loop shape as shown in Figure 1.

Referring to Figure 2, it will be seen that the cushion 16 completely surrounds the bonding strip 20. Thus, whenever the tube clamp grips a tube, the cushion will form a moisture-proof seal completely around the bonding strip, insuring that there will be no corrosion. The bonding strip 16 is secured to strap 10 by a spot weld 22. The cushion 16 is secured to the strap 10 with a bond that will resist water, gasoline and oil.

Figure 3:
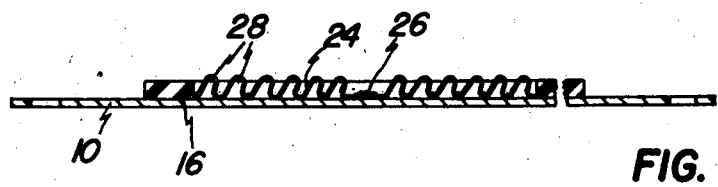
Figure 3 is an elevation view, in section, of a modified form of the invention before being bent to final form.

The formation of the bonding strip is shown more clearly in Figure 3, wherein a bonding strip 24 is of a modified type in that it is welded in the middle by a spot weld 26 instead of the end as in Figure 2. The strip 20 is folded loosely to present a series of corrugations or ridges. It will be noticed that ridges 28 on the bonding strip 24 project above the normal surface of the cushion 16. The strip 24 is made of resilient material, and when a tube is gripped by the clamp the ridges will resiliently flatten against the tube, maintaining a steady pressure but not great enough to harm the tube.

It is well known that most tubes and conduits used on airplanes have a protective coating of lacquer or chemical to protect them from corrosion. This protective coating is also an insulator interfering with the bonding of the tube. When such a tube is gripped by a clamp of the present invention, the steady pressure of the ridges of the conductor strip, in combination with the intense vibration encountered in airplanes, soon cracks and wears through this protective coating, insuring positive grounding of the tube to the clamp.

Figure 4:
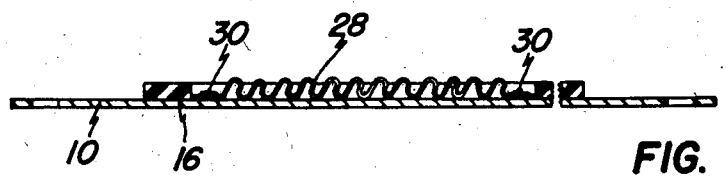
Figure 4 is an elevation view, in section, of a third form of the invention before being bent to final form.

In Figure 4 is shown a tube clamp in strip form which differs from the others in that a bonding strip 28 is spot welded to strap 10 at both ends by spot welds 30. This doubly insures positive electrical bonding of the strip 28 to the strap 10.

In all the forms of the invention, no difficulty is encountered in crimping the bonding strip when bending the flat assembly to final loop form. The bellows type structure of the bonding strip permits a compression longitudinally during the bending operation.

Although this invention has been described with reference to particular embodiments thereof, it is not limited to the details of this description nor otherwise, except by the terms of the following claims.

I claim:

1. In a tube clamp, a tube embracing strap, a cushion on the inner face thereof having a hole, and a folded strip of resilient conductor material lying substantially within said hole and secured to said strap, the folds projecting at least as high as the normal surface of the cushion.

2. In a tube clamp, a tube embracing strap, a cushion on the inner face thereof having a hole, and a bent strip of resilient conductor material lying substantially within said hole, said bent strip having a plurality of bend portions adapted to contact said strap and having a plurality of bend portions projecting at least as high as the normal surface of the cushion for engaging a tube clamped by the tube clamp and effecting electrical connection between the tube and said strap.

EARL PALMER NICHOLLS.

REFERENCES CITED

The following references are of record in the file of this patent:

UNITED STATES PATENTS

| Number | Name | Date |
| --- | --- | --- |
| 2,279,865 | Ellinwood | Apr. 14, 1942 |
| 1,690,220 | Fahnestock | Nov. 6, 1928 |
| 2,291,887 | Ellinwood | Aug. 4, 1942 |
| 2,331,258 | White | Oct. 5, 1943 |
| 2,279,824 | Keefe | Apr. 14, 1942 |